July 18, 1961

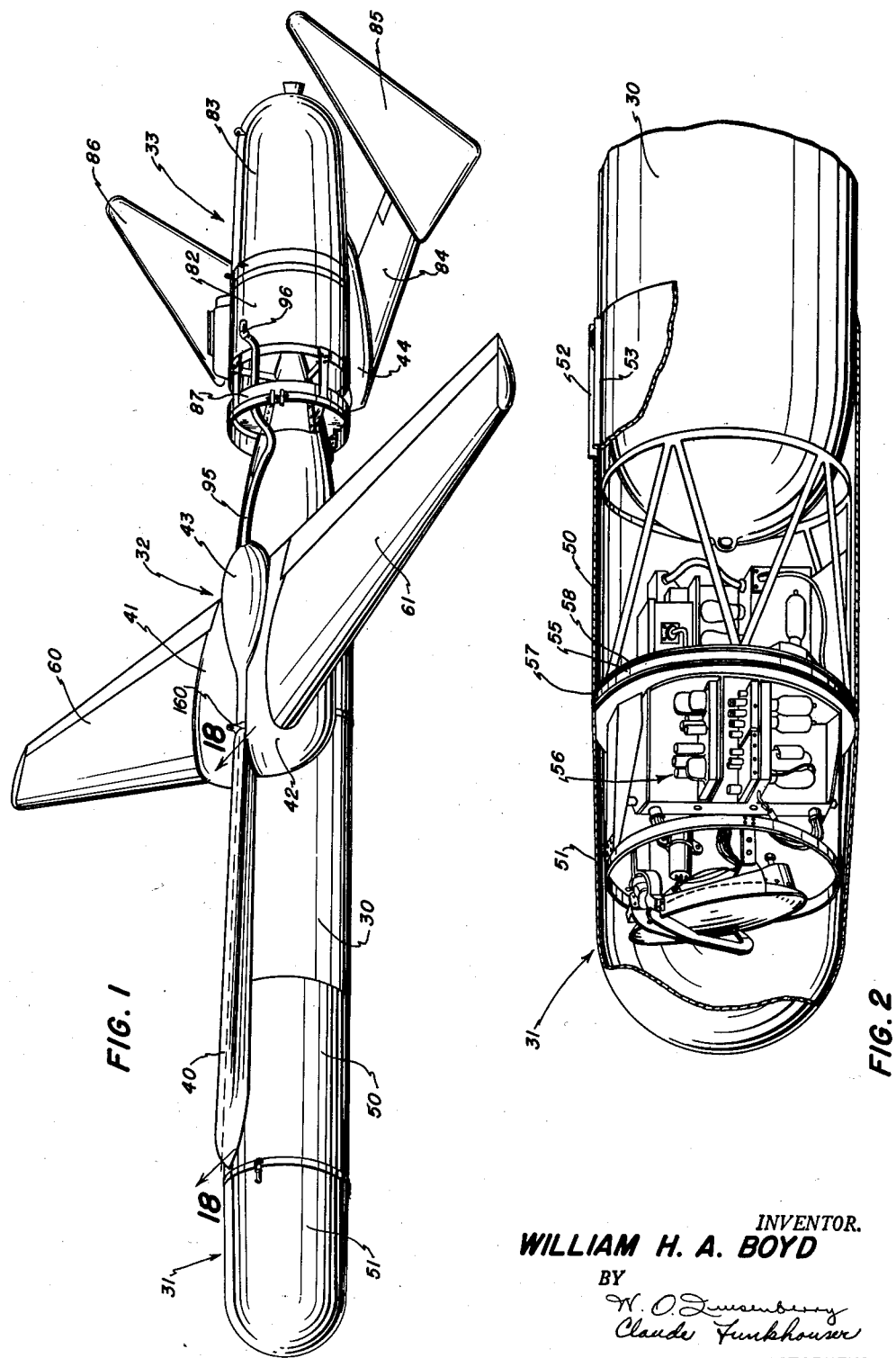

W. H. A. BOYD 2,992,794

GUIDED MISSILE

Filed Dec. 13, 1950

INVENTOR.
WILLIAM H. A. BOYD
BY
ATTORNEYS

July 18, 1961
W. H. A. BOYD
2,992,794
GUIDED MISSILE
Filed Dec. 13, 1950
5 Sheets-Sheet 3
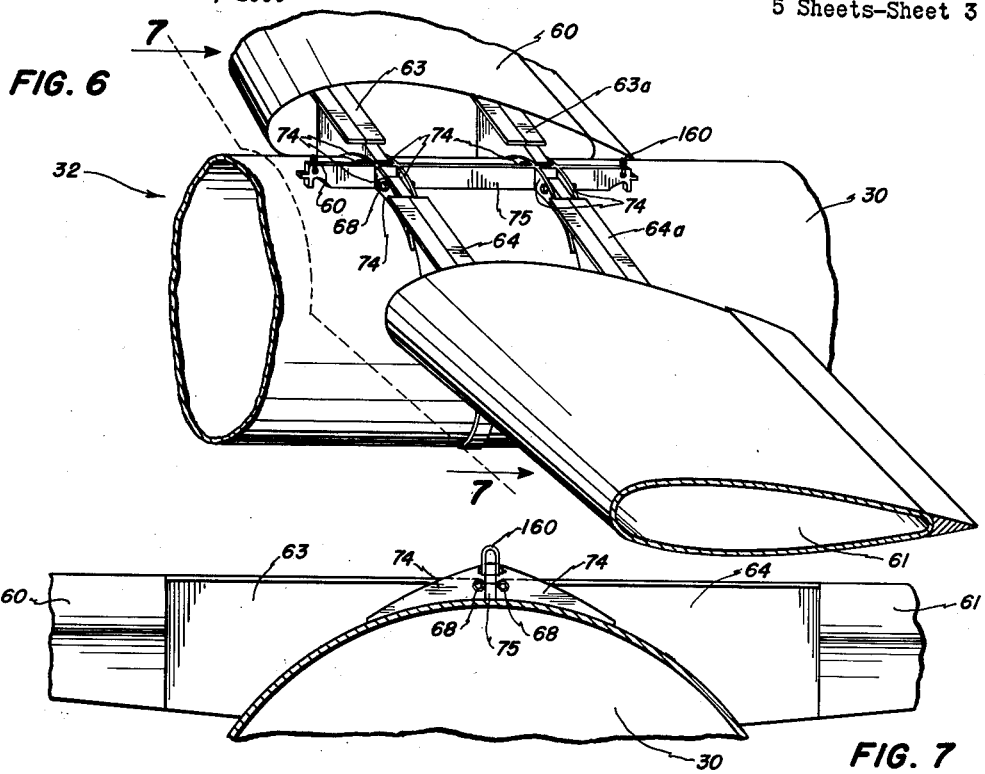
FIG. 6
FIG. 7
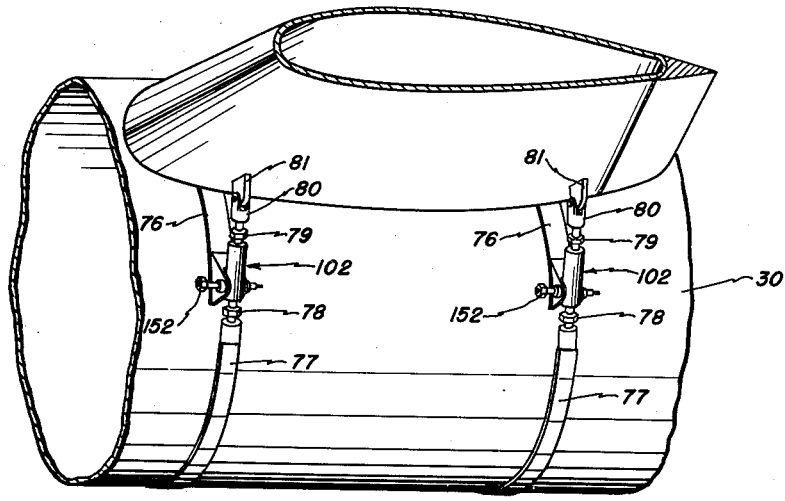
FIG. 8
INVENTOR.
WILLIAM H. A. BOYD
BY
W. O. Quesenberry
Claude Funkhouser
ATTORNEYS

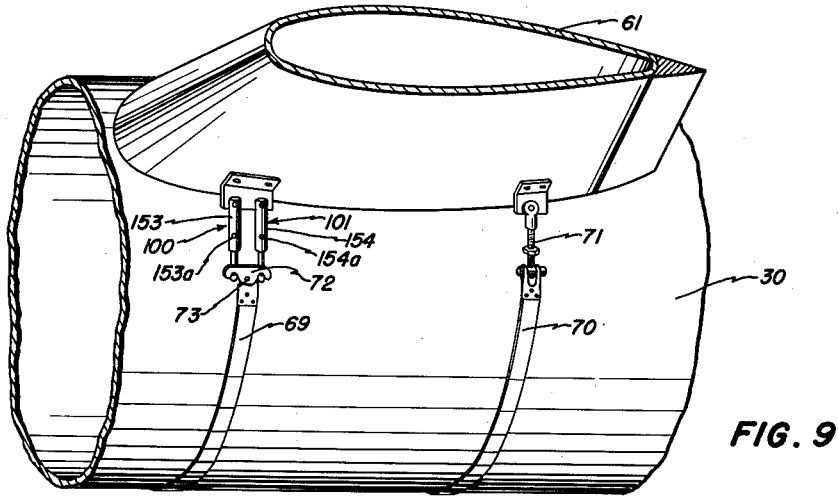
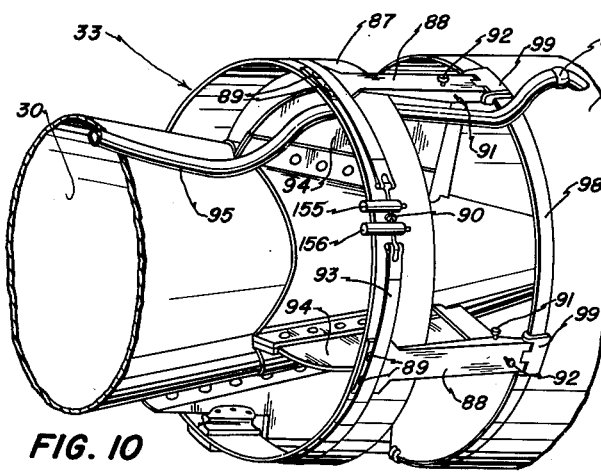
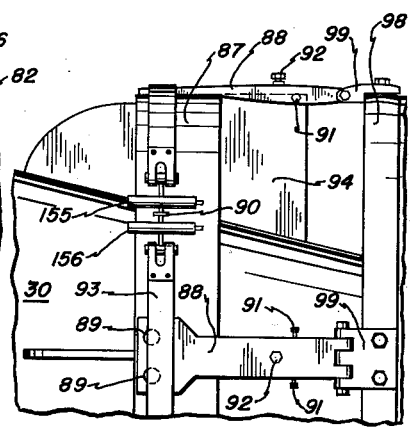
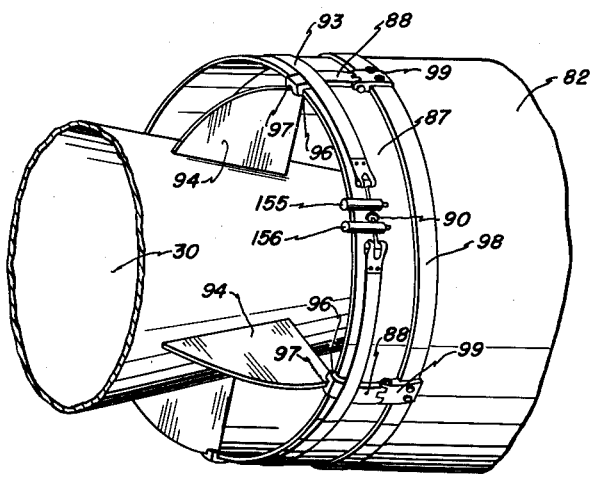

July 18, 1961 W. H. A. BOYD 2,992,794
GUIDED MISSILE
Filed Dec. 13, 1950 5 Sheets-Sheet 5
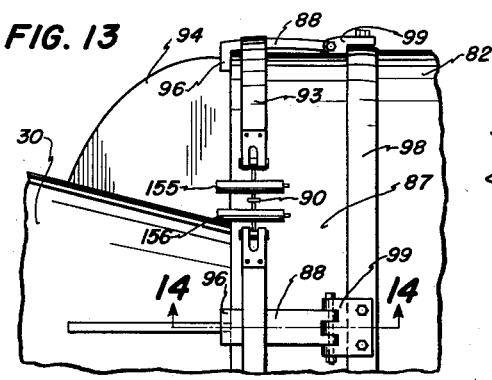
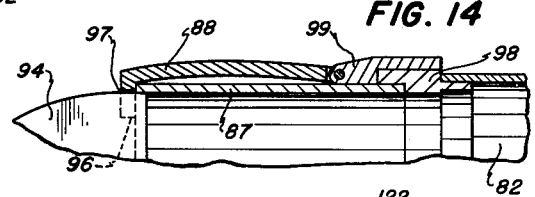
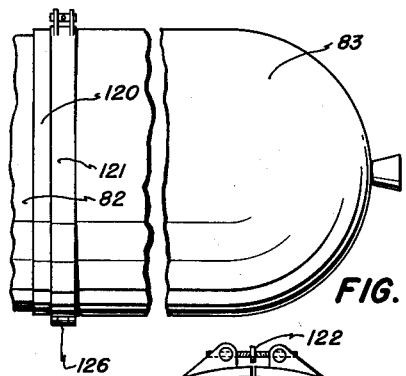
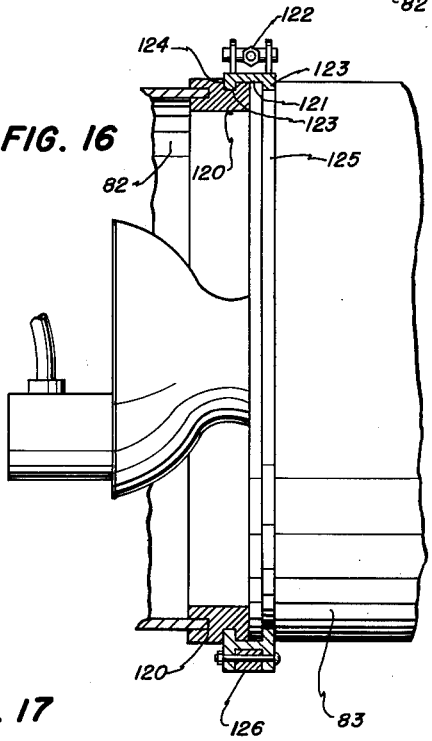
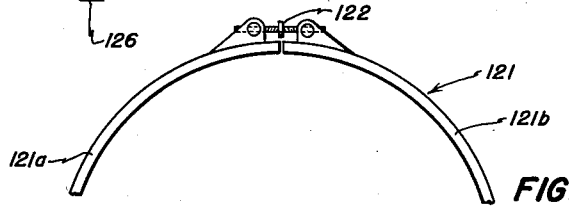
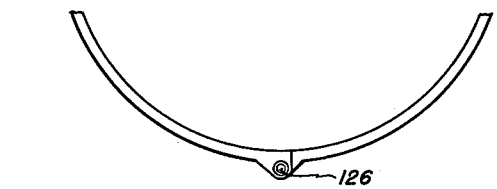
INVENTOR.
WILLIAM H. A. BOYD
BY
ATTORNEYS

United States Patent Office 2,992,794
Patented July 18, 1961

2,992,794
GUIDED MISSILE
William H. A. Boyd, Kensington, Md., assignor to the United States of America as represented by the Secretary of the Navy
Filed Dec. 13, 1950, Ser. No. 200,680
6 Claims. (Cl. 244—14)
(Granted under Title 35, U.S. Code (1952), sec. 266)

The present invention relates generally to guided missiles, and more particularly to an air flight guided missile and its assembly, wherein a plurality of air flight appendages are removably attached to the body of a substantially conventional explosive charge or payload to attribute desired aerodynamic characteristics to the missile so assembled, such that the body of said conventional payload in itself forms an integral part of the airframe thus provided.

It is contemplated by the present invention to provide an air flight guided missile for delivering a substantially convenitional payload over a relatively great distance to a desired target area by air, so that the payload may proceed against the target in its normal manner of operation after release therefrom of the previously mentioned airframe appendages. For example, a suitable wing structure, empennage structure, propelling motor, and intelligence system may be attached to an underwater torpedo, so that when launched into the air the torpedo and its air flight appendages may be delivered as an air flight guided missile to a desired target area, and upon reaching a desired missile-to-target range, the above-mentioned appendages may be shed from the torpedo, permitting the torpedo to enter the water and proceed against the target in its normal manner of operation; and if desired, the torpedo itself may be directed in its water course toward the target by its own sonic homing system or the like. As an additional example, a plunge bomb may be similarly equipped with such air flight appendages as previously mentioned to be delivered by air to a desired target area and, upon reaching a desired missile-to-target range, start a dive maneuver of a desired angle of depression. At some point during this dive the air flight appendages may be shed from the plunge bomb, permitting it to proceed against the target by plunge dive into the water in accordance with its normal mode of operation. As a still further example, the present invention may be employed in conjunction with a drop bomb as a payload in which the air flight appendages are attached to the bomb, enabling it to be delivered by guided air flight to a desired target area. At a predetermined missile-to-target relationship the drop bomb may shed the air flight appendages, enabling it to proceed against the target in the normal manner of drop bombing.

Although missiles are known to the prior art which are designed to deliver a payload by air to a desired target area and then to release the payload from the airframe, to permit the payload, such as an underwater torpedo or drop bomb, to proceed against the target in its normal manner of operation, the principles of assembly of the airframe with the payload there employed are substantially different from that contemplated by the present invention. In the prior teachings, a unitary independent airframe is provided to which the payload is attached as an appendage of the air flight missile, or the payload is housed within the body of the unitary airframe. Disadvantages are inherently attendant in such prior art structures, which are essentially integral and independent vehicles or carriages for the air transportation of the payload. For example, an integral airframe or payload air carriage is generally very bulky and unwieldy, making transportation thereof or field assembly with a payload difficult and frequently impractical or impossible; also, the relatively great mass of an integral airframe or payload air carriage increases the power necessary for obtaining a desired air flight speed of the missile; and further, in some instances such carriages result in difficulty of clean separation of the payload therefrom.

In accordance with the present invention, however, the various air flight appendages are substantially individually removably affixed to the body of the payload, thereby providing no independent airframe per se, but including the body of the payload itself as an integral and basic part of the aerodynamic structure of the air flight missile, thus in a large measure overcoming the above-mentioned disadvantages of the prior art structures.

It is therefore one object of the present invention to provide an air flight missile wherein suitable air flight appendanges are removably secured to a substantially conventional payload, to enable the delivery of the payload to a desired target area by air flight of the missile and the shedding of the appendages to free the payload for an attack against the target in its normal manner of operation.

Another object of the present invention is to provide an air flight missile wherein suitable air flight appendages are removably secured to a substantially conventional payload to impart suitable aerodynamic characteristics to the payload and to enable the air flight thereof, wherein said appendages are substantially individually affixed to the body of said payload, thereby making said payload an integral part of the airframe.

Another object of the present invention is to provide an air flight missile by removably securing air flight appendages to a substantially conventional payload to impart desired aerodynamic characteristics thereto, wherein the payload forms an integral and essential part of the missile airframe thus provided.

Other objects and advantages of the present invention will become apparent to those skilled in the art from a consideration of the following detailed description thereof had in conjunction with the accompanying drawings, in which like numerals refer to like or corresponding parts and wherein:

FIG. 1 is a perspective view of a completely assembled missile embodying the present invention;

FIG. 2 is a cutaway and enlarged view of the nose of the missile shown in FIG. 1;

FIG. 6 is an enlarged view of the central portion of a missile with the fairings removed to show a second method of attaching the wings to the payload;

FIG. 7 is a cross-sectional view of the missile shown in FIG. 6 taken substantially along the line 7—7 thereof;

FIG. 8 is a view of the same portion of the missile and of the same modification of wing assembly as shown in FIG. 6, but illustrating the assembly from the underside of the wings;

FIG. 9 is a view of the same portion of the missle and of the same modification of wing assembly as shown in FIG. 4, but illustrating the wing assembly from the underside of the wing;

FIG. 10 is an enlarged view of a portion of the tail of the missile shown in FIG. 1, illustrating the assembly of the empennage to the payload.

FIG. 11 is a detailed enlarged view of a portion of the empennage assembly shown in FIG. 10;

FIG. 12 is an enlarged view of a portion of the tail section of a missile, illustrating a second mode of attachment of the empennage to the payload;

FIG. 13 is a detailed and enlarged view of a portion of the empennage assembly shown in FIG. 12;

FIG. 14 is a cross-sectional view of a portion of the empennage assembly shown in FIGS. 12 and 13, and taken substantially along the line 14—14 of FIG. 13;

FIG. 15 is a view of a portion of the missle empennage showing the motor attachment;

FIG. 16 is an enlarged vertical section of the portion of the missile illustrated in FIG. 15;

FIG. 17 is an enlarged elevational view of the clamping ring utilized for attaching the motor to the empennage; and FIG. 18 is a fragmentary longitudinal sectional view of a portion of the missile assembly taken substantially along the line 18—18 of FIG. 1.

Figure 3:
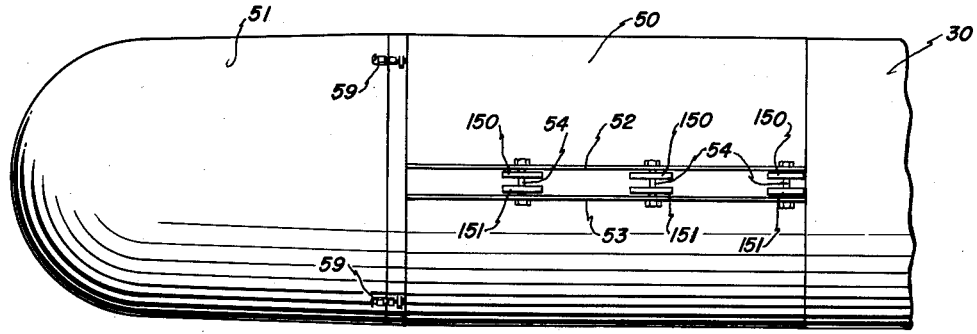
FIG. 3 is a top view of the nose of the missile shown in FIG. 1 with a top fairing removed to show the means of assembling the nose cowl to the payload.

Referring now to the drawings, by way of example the embodiments there depicted utilize an underwater torpedo 30 as the missile payload, to which are removably secured a nose section generally indicated by the numeral 31 for housing a radar homing intelligence system or the like, a wing section generally indicated by the numeral 32, and an empennage and motor generally indicated by the numeral 33. To provide suitable airfoil characteristics to the assembled air flight missile, the fairings 40, 41, 42, 43, and 44 and others where necessary are provided for covering mechanism essential to the assembly and desired operation of the missile, as will subsequently become apparent.

Referring particularly to the nose section 31 of the missile, its exterior comprises a nose cowl 50, which may be frictionally secured to the nose of the torpedo 30, and a radome 51 clamped to said nose cowl. In FIGS. 2 and 3 the fairing 40 has been removed to disclose the means whereby the nose cowl 50 is affixed to the nose portion of the torpedo; and as there shown this cowl is formed of a suitable springlike structural material such as sheet metal, and is substantially cylindrical in shape, although preferably slightly tapered in the forward direction to conform substantially to the exterior contour of the torpedo 30 along a portion of its nose section to provide suitable frictional engagement therebetween. This cowl 50 is not a complete cylinder but is provided with two substantially parallel edges along the cylindrical length thereof, allowing it to be extended or contracted in diameter for facilitating the positioning thereof over the nose of the torpedo and the secure frictional clamping thereof in adjusted position. For clamping purposes this cowl is formed with up turned flanges 52 and 53 along said edges provided on the cylindrical length thereof. A plurality of bolts 54 connect and cooperate with these flanges to reduce the diameter of the cowl 50 and bring it into firm frictional engagement with the circumference of the nose of the torpedo 30. A bulkhead 55 for supporting a radar homing intelligence system 56, or the like, is clamped and supported in position by the nose cowl 50 when the latter is tightened about the nose of the torpedo, this being accomplished by entrance of the inturned circumferential flange 57 formed on the forward end of the nose cowl into the circumferential groove 58 formed in the bulkhead. The radome 51 may then be secured to the bulkhead 55 by any suitable means indicated by the numeral 59, as by clamps, bolts, snap latches, and the like.

Figure 4:
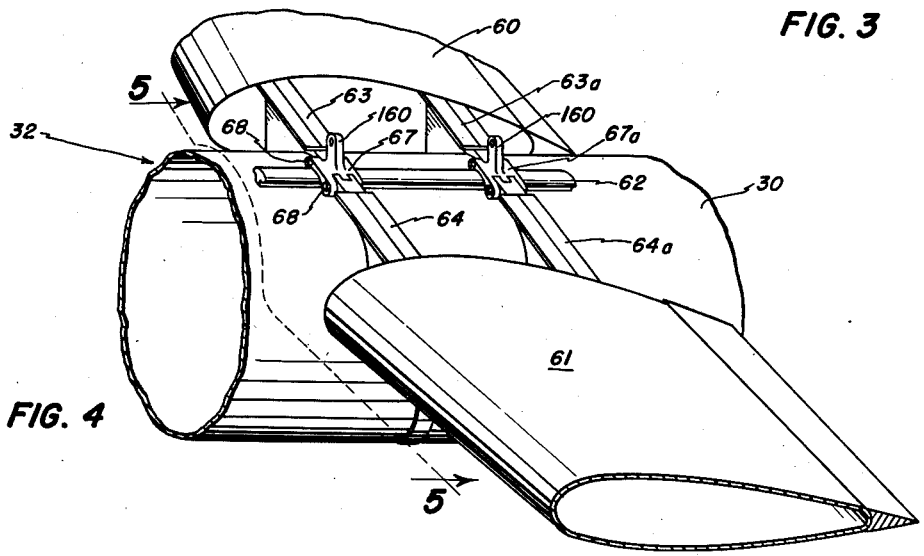
FIG. 4 is an enlarged view of a portion of the missile shown in FIG. 1 with fairings removed to show the assembly of the wings to the payload.
Figure 5:
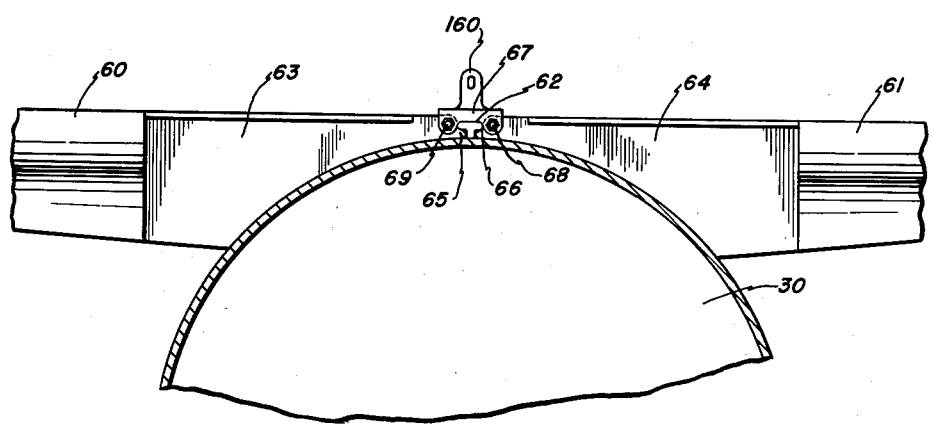
FIG. 5 is a cross-sectional view of the missile taken substantially along the line 5—5 of FIG. 4.

One modification of the assembly of the wing structure 32 to the payload torpedo 30 is shown in FIGS. 4, 5, and 9. For this assembly a T-bar 62 is securely affixed such as by welding to the body of the torpedo 30. The wings 60 and 61 are supported by the beams 63 and 63a, and 64 and 64a, whose bottom edges are curved to conform to the contour of the torpedo 30 when the wings are in flight position. The beams 63 and 64 are pivotally attached to the fitting 67 by such means as bolts 68. The fitting 67 is designed to conform to the top of the T-bar 62 as shown in FIG. 5, while the ends of the beams 63 and 64 are provided with the tongues 65 and 66 which enter the slots provided between the T-bar 62 and the torpedo body 30 when the wings are spread into flight position, as also shown in FIG. 5. The beams 63a and 64a are similarly provided and attached to the corresponding pivot fitting 67a. Thus, with the beams 63 and 64 pivotally secured to the fitting 67, and the beams 63a and 64a pivotally secured to the fitting 67a, when the wings 60 and 61 are jackknifed upwardly the tongues 65 and 66 of said beams open to enable the positioning of the fittings 67 and 67a on top of the T-bar 62; whereupon, the pivotal lowering of these wings causes the afore-mentioned tongues 65 and 66 to close upon the T-bar 62 by entrance thereof into said slots formed between the T-bar and the torpedo.

Referring particularly to FIG. 9, a pair of straps 69 and 70 are there shown secured at their ends to the underside of wing 61 and extending around the torpedo 30 to be similarly secured at their opposite ends to the underside of the opposite wing 60. The end of strap 70 shown in FIG. 9 is secured to the underside of wing 61 through the turnbuckle 71, while the corresponding end of strap 69 is secured to the wing 61 through the pivot plate 72, rockable about pivot pin 73, and explosive bolts 100 and 101 which are hooked under the pivot plate 72. The opposite end of strap 70 is affixed to wing 60 by an arrangement identical to that shown in FIG. 9 for strap 69, while the opposite end of strap 69 from that shown in FIG. 9 is affixed to the wing 60 by an arrangement identical to that shown for strap 70. By adjustment of the turnbuckle 71 and the corresponding turnbuckle for strap 69 (not shown), the wings 60 and 61 and wing supporting beams 63, 64, 63a, and 64a are drawn tightly and securely in position astride the torpedo 30 as shown in FIGS. 4, 5, and 9, while the tongues 65 and 66 are caused to bite the T-bar 62.

The assembly of the wing structure to the torpedo may be modified as shown in FIGS. 6, 7, and 8 of the drawings. In this modification a bar 75 is provided with a plurality of paired, transversely extending, substantially arcuately shaped arms 74 conforming along their undersides to the curavture of the body of the torpedo 30, so that the bar and these projecting arms may be seated on the torpedo, and if desired positioning lugs or the like (not shown) may be formed on the undersurface of the bar 75 for cooperation with corresponding recesses in the torpedo body 30 to provide for accurate positioning of this bar. Each of said pairs of projecting arms 74 is provided with a strap 76 connecting with one end of a strap 77 through an explosive bolt 102 and a turnbuckle 78, so that by adjusting each turnbuckle 78 each of the straps 76 and 77 may be drawn together to firmly saddle the bar 75 in position upon the torpedo 30. In the instant embodiment, the view shown in FIG. 8 of the assembly under the wing 61 is identical to the assembly provided under the wing 60. After the bar 75 is properly saddled, the wings are pivotally mounted on the torpedo by inserting the end of each of the beams 63, 64, 63a, and 64a between a corresponding pair of bar projecting arms 74 and are secured thereto by means of bolts 68 or the like, as shown in FIGS. 6 and 7. The wings are then pivoted into flight position by knifing lugs 81 on the bottom side of each of the wings 60 and 61 into the bifurcated receptacles 80 provided therefor, and bolting or otherwise securing these two elements together. The bifurcated receptacles 80 are united to the straps 77 through turnbuckles 79, explosive bolts 102, and turnbuckles 78, as shown in FIG. 8. By proper adjustment of the turnbuckles 78 and 79, the wings 60 and 61 are brought into secure flight position with respect to the torpedo 30 by the arcuate shaped torpedo engaging edges of beams 63, 64, 63a, and 64a being brought into bearing engagement with the torpedo body, as best shown in FIG. 7.

If desired, shackles 160 may be provided on either modification of wing assembly to facilitate handling of the assembled missile and mounting thereof on aircraft.

The empennage, generally indicated by the numeral 33, is removably affixed to the shroud ring 87 of the torpedo 30, and comprises a cowl 82, formed of sheet metal or other suitable structural material, to which is secured a turbo-jet engine 83 or the like, a pair of horizontal stabilizers 84, and a pair of vertical stabilizers 85. Referring particularly to the empennage attachment illustrated in FIGS. 10 and 11, the empennage cowl 82 is provided about its circular forward edge, structurally reinforced by band 98, with a plurality of pivotable arms 88 designed to reach substantially across the torpedo fins 94 to the torpedo shroud ring 87, and are provided at their shroud ring engaging ends with lugs 89 which enter suitable holes provided therefor in the shroud ring. A strap 93 extends about the shroud ring over the ends of the arms 88 and has its ends united by a turnbuckle 90, so that with the arms 84 properly located with their positioning lugs 89 in registry with the holes therefor in the shroud ring 87, adjustment of turnbuckle 90 tightens strap 93 about the shroud ring to hold said lugs in their positioning holes, thereby securely attaching the cylindrical empennage cowl 82 to the tail of the torpedo. As indicated in FIG. 11, the arms 88 are grooved along a portion of their length midway between the sides thereof for receiving the top edges of the torpedo fins 94, and in addition each arm is provided with a pair of side compensation bolts 91 and a top compensation bolt 92, the former being adjustable to bear against the sides of the fins 94 and the latter to bear against the top edge thereof, to compensate for tolerances between the grooves and the fins to eliminate any play therebetween. In addition, by overtightening bolts 92 against the top edges of fins 94 an outwardly directed spring force is imposed upon the arms 88 restrained by the strap 93, the purpose of which will be explained subsequently.

A modified means of attaching the empennage cowl 82 to the shroud ring 87 of the torpedo, particularly adapted to a modified torpedo tail structure, is shown in FIGS. 12, 13, and 14. As can be seen from FIG. 12, this latter modification of empennage attachment is particularly adapted to torpedoes whose tail fins do not extend aft of the shroud ring, as they do in the modification shown in FIGS. 10 and 11. In the present modification, the cylindrical empennage cowl 82 is provided at its torpedo engaging end with the circular reinforcing band 98, to which a plurality of extending arms 88 are pivotally secured, as in the preceding embodiment of the empennage attachment. In the instant modification, however, the arms 88 are different from those of the preceding embodiment, being shaped to merely overlay the shroud ring 87 and terminating at their free ends with inwardly extending lips 96 for encompassing the forward edge of the shroud ring. The lips 96 are further provided with the slots 97 for engaging the outer edges of the tail fins 94 to increase the stability of the attachment and insure proper positioning of the empennage with respect to the remainder of the missile. With the empennage thus placed in position at the tail of the torpedo and the arms 88 swung into position to embrace the shroud ring, strap 93 is placed over the arms 88 about the shroud ring 87 and tightened thereon by adjustment of the turnbuckle 90, to securely hold the arms in engagement with the shroud ring.

The horizontal stabilizers 84 are secured to the empennage cowl 82 by any suitable means and may be attached thereto before assembly of the cowl to the torpedo or after assembly thereof as desired. Similarly the vertical stabilizers 85 and 86 are secured to the horizontal stabilizers 84 by any suitable desired means, and may be attached thereto at any point in the assembly of the missile as desired.

The motor 83, indicated in the drawings as a turbo-jet engine, may be as previously mentioned a part of the empennage 33, and as such is attached to the torpedo payload 30 through the intermediary of the empennage cowl 82. For this purpose the empennage cowl is provided with a reinforcing end ring 120 at its rear end, as shown in FIG. 16, having an outer circumferential groove 124 provided therein, while the cowl abutting end of the motor 83 is provided with a corresponding circumferential groove 125. A circumferential clamp 121, shown in FIG. 17, comprises two substantially semicircular strips 121a and 121b having two of their ends hinged at 126, while the other two ends thereof are connected through the turnbuckle 122. As shown in FIG. 16, this clamping band 121 is provided with two inwardly projecting flanges 123 about the circumference of the circular ring thus formed and spaced from each other to enter the grooves 124 and 125 on the cowl 82 and on the motor housing 83 respectively; so that when the cowl 82 and motor 83 are brought end to end and when the clamping band 121 is positioned about the empennage cowl and motor and tighted thereon by adjustment of the turnbuckle 122, the motor 83 becomes securely clamped to the empennage cowl. The motor may be attached to this cowl either before or after attachment of the cowl to the shroud ring of the torpedo, as desired. The motor thus attached must of course be supplied with fuel, and since the most convenient place for fuel storage is within the wings 60 and 61, a fuel line 95 (FIG. 10) is provided for connecting such a fuel tank with the motor 83.

Referring now particularly to FIG. 18, the fairing 40 (also shown in FIG. 1) is fastened at its forward end in position upon the missile by means of spring clips 108, indirectly secured to the torpedo, engaging depending brackets 109 secured to the fairing; and it is fastened at its rear end by being bolted to standards 107 secured, in the case of the wing embodiment shown in FIG. 4, to bolts 68 employed in securing the wings 60 and 61 to the fittings 67, or in the case of the wing embodiment shown in FIG. 6, to projections 74. Intermediate its ends, the fairing 40 is held in position by the depending lugs 111 affixed thereto and entering the resilient friction retaining receptacles 110 provided therefor. The fairing retaining fixtures 108 and 110 may be carried by any suitable mounting structures indirectly secured to the torpedo, as by engagement thereof with the clamping bolts 54 of cowl 50. The other fairings 41, 42, 43, and 44, and such others as may be found necessary or desirable may be affixed to the missile by permanent or removable connection to the above-described appendages, by means similar to those described for the fairing 40, or by any other suitable means as will be apparent to those skilled in the art.

Having thus described the assembly of the appendages comprising the nose 31, the wing structure 32, and the empennage 33 to the torpedo payload 30, the quick detachment thereof from said payload for accomplishing the previously described purposes of the present invention will now be considered. First considering the detachment of the nose 31 of the assembled missile, it is to be recalled that the nose cowl 50 is preferably formed of sheet metal offering a resilient resistance to the drawing thereof about the torpedo, as is accomplished by the tightening of bolts 54. Therefore, for removal of the cowl 50, two electrically fired squib guns 150 and 151 are carried by each of the bolts 54, which when fired shear the bolts; whereupon, the resilience of the cowl 50 causes it to expand away from the body of the payload 30 and to drop free thereof. Furthermore, this release of the cowl 50 disengages it from the bulkhead 55, enabling the bulkhead, the intelligence equipment 56 mounted thereon, and the radome 51 attached thereto to also drop free from the torpedo. In the instant embodiment, two squib guns are shown and described for each clamping bolt 54; however, only one such squib gun is required for each bolt to accomplish the shearing action, the second being suggested merely for insuring proper operation of the missile in jettisoning the nose appendage. Also, as will be apparent to those skilled in the art, instead of using squib guns for shearing the bolts 54, an electrically operated solenoid or the like may be employed for securing and releasing the cowl 50.

In the means illustrated in FIGS. 4, 5, and 9 for attaching the wings 60 and 61 to the torpedo, the two pairs of squib guns 153 and 154, of explosive bolts 100 and 101 which cooperate with straps 69 and 70, operate to shear pins 153a and 154a when fired to release the entire wing appendage. When it is desired to jettison the wings from the torpedo, both pairs of squib guns may be electrically fired to release the straps 69 and 70, permitting the upward lift of the air acting on the wings when the missile is in flight to jackknife the wings 60 and 61 upwardly and carry them away from the torpedo 30. Although the present invention is here again shown and described as providing two explosive bolts for each strap 69 and 70, it is apparent that only one need be employed for each strap, the second one being provided merely as a safety factor to insure proper operation; and here again solenoid operated latches or the like may be employed in place of the explosive bolts, as would be apparent to one skilled in the art. In the event that only one of each pair of squib guns 153 and 154 should fire, the provision of the rocking plate 72 enables the wings 60 and 61 to still be released from the torpedo 30. Since, as was previously suggested, the volume within the wings 60 and 61 may be employed for storing a fuel tank, and the fuel line 95 is therefore provided therefrom to the motor 83, a slip joint 96 (FIG. 1) is inserted in this fuel line to prevent its fouling about the torpedo shroud ring 87 when the wing and empennage appendages are jettisoned. In the modification of the wing attachment shown in FIGS. 6, 7 and 8, the release of the straps 77 and hence of the wings 60 and 61 from the torpedo 30 is also controlled by a pair of explosive bolts 102 for each strap, one located under each of the wings 60 and 61 for each strap. Here again, two explosive bolts are employed where one would be sufficient to insure proper release of the wing appendage. Each bolt is supplied with its squib gun 152 for rupturing the bolt.

Jettisoning of the empennage is likewise controlled by two squib guns 155 and 156 which are positioned on the turnbuckle 90 of strap 93, so that upon firing of either one or both of these squib guns the turnbuckle 90 is sheared to release the strap and to free the arms 88 from the shroud ring by air flow past the missile, as in the embodiment shown in FIG. 12, or to permit the arms to be spring forced outwardly by action of compensation bolts 92, as in the embodiment shown in FIG. 12, leaving the entire empennage assembly free to fall clear of the tail of the torpedo. Here again, only one squib gun is necessary, the second being provided for the same reason as previously mentioned.

An air flight missile is thus provided comprising a substantially conventional payload, an underwater torpedo in the instant embodiment, to which suitable air flight appendages have been affixed to impart desired aerodynamic characteristics to the missile thus assembled; wherein substantially each appendage is separately and independently mounted upon the payload, thus making the body of the payload itself a basic and integral part of the airframe. In addition, these appendages are each so mounted as to enable the ready and quick jettisoning thereof during the missile flight. As an example of one mode of operation of a missile of the type herein described, the assembled missile may be launched from a mother aircraft with its radar homing intelligence system 56 set to seek and guide the missile to a selected target area. The missile thereupon proceeds to said area under the motive power of its engine 83. Upon reaching a predetermined range from the target, as indicated by its radar intelligence system 56, an electric squib firing circuit may be initiated to simultaneously ignite all of the squib guns 150, 151, 152, 153, 154, 155, and 156, thereby substantially simultaneously freeing the nose, wing, and empennage (including the motor) appendages from the torpedo: the wings 60 and 61 rising from the torpedo body and carrying the fairings 40, 41, 42, and 43 with the base fixtures 151 for the fairing retaining fittings 108 and 110 therewith; the nose assembly comprising the radome 51, the nose cowl 50, and the intelligence system 56 dropping clear of the nose of the torpedo; and the entire empennage assembly dropping clear of the tail of the torpedo. The torpedo payload 30 is thus permitted to continue under its own momentum stripped of its air flight appendages, and to enter the water under the force of gravity; whereupon, its own propelling means may be initiated by any desired means, as by the water impact, to propel the torpedo underwater against a desired target in the area, as guided by a torpedo sonic homing head or the like. Thus, there is provided an air flight missile designed to be delivered by self-propelled, guided air flight to a desired target area over a relatively great distance therefrom. Upon reaching the target area, the air flight appendages are jettisoned from the payload to enable the same to proceed against the target substantially in its conventional mode of operation.

It is to be understood that the suggested modes of operation of the present missile are not intended to be all inclusive, and the scope of the present invention is not limited thereto, nor is its scope limited to the employment of an underwater torpedo as the payload or base of the airframe structure, nor to the particular details of the air flight missile assembly, nor to the particular details of the air flight appendages structures herein suggested; but modifications of the missile herein described, as will be apparent to those skilled in the art, which are within the spirit and scope of the present invention as defined by the appended claims, are within the contemplation of the present patent.

The invention described herein may be manufactured and used by or for the Government of the United States of America for governmental purposes without the payment of any royalties thereon or therefor.

What is claimed is:

1. An air flight guided missile comprising an underwater torpedo, a nose appendage releasably secured to the nose of said torpedo for housing a missile guiding intelligence system, a wing structure releasably secured to said torpedo substantially about the mid-section thereof, and an empennage releasably secured to the tail of said torpedo having a missile propelling motor attached thereto, and means for substantially simultaneously releasing said nose appendage, wing structure, and empennage from said torpedo to enable the jettisoning thereof during air flight of the missile; said nose appendage being formed in part of resiliently flexible material shaped to substantially encompass the nose of the torpedo, and means for clamping said resilient nose appendage into frictional engagement with the torpedo nose; strap means extending about the belly of the torpedo for securely saddling said wing structure thereto; and arms pivotally attached to said empennage and engaging the shroud ring of said torpedo for securing said empennage thereto; thereby enabling the delivery of a torpedo to a target area by self-propelled, guided air flight thereof and the jettisoning of the air flight appendages therefrom during air flight to enable the torpedo to proceed against the target substantially in its normal mode of operation.

2. An air flight guided missile comprising a substantially conventional payload, a nose appendage releasably secured to the nose of said payload for housing a missile guiding intelligence system, a wing structure releasably secured to said payload substantially about the mid-section thereof, and an empennage releasably secured to the tail of said payload having a missile propelling motor attached thereto, and means for substantially simultaneously releasing said nose appendage wing structure and empennage from said payload to enable the jettisoning thereof during air flight of the missile; said nose appendage being formed in part of resiliently flexible material shaped to substantially encompass the nose of the payload, and means for clamping said resilient nose appendage into frictional engagement with the torpedo nose; strap means extending about the belly of the payload for securely saddling said wing structure thereto; and arms pivotally attached to said empennage and engaging the tail of the payload for securing said empennage thereto; thereby enabling the delivery of a payload to a target area by self-propelled, guided air flight thereof and the jettisoning of the air flight appendages therefrom during air flight to enable the payload to proceed against the target substantially in its normal mode of operation.

3. An air flight guided missile comprising a payload, a nose appendage for housing a missile intelligence system, means for securing this appendage to the nose of the payload, a wing appendage, means for securing this appendage to said payload substantially about the mid-section thereof, an empennage appendage including a missile propelling motor, means for securing this appendage to the tail of the payload, and means cooperating with each of said appendage securing means for releasing them from said payload during air flight of the missile, thereby enabling the delivery of a payload to a target area by self-propelled, guided air flight thereof and the jettisoning of the air flight appendages therefrom during air flight to enable the payload to proceed against the target substantially in its normal mode of operation.

4. An air flight missile comprising a payload, a nose appendage, a self-contained target seeking and missile guiding intelligence system housed within said nose appendage, means for securing this appendage to the nose of the payload, a wing appendage, means for securing this appendage to said payload, an empennage appendage, means for securing this appendage to the tail of the payload, a propelling motor appended to the missile, and means cooperating with the appendages for releasing them from the payload during air flight of the missile in response to a signal from said intelligence system, thereby enabling the delivery of a payload to a target area by self-propelled air flight thereof and the jettisoning of the air flight appendages therefrom during air flight to enable the payload to proceed against the target substantially in its normal mode of operation.

5. An air flight missile comprising a payload, a plurality of independent air flight appendages individually secured to said payload, and means for releasing said appendages during air flight of the missile, said appendages including a wing structure saddled to said payload substantially at its mid-section, a missile intelligence system releasably secured to the nose portion of the payload, and an empennage structure affixed to the tail portion of the payload, said means for releasing the appendages being actuated in response to a predetermined signal from said intelligence system, the body of the payload thereby forming an integral and basic part of the missile airframe and said appendages being jettisonable during the attack of the missile against a target to permit the missile to terminate its attack in a manner substantially equivalent to the payload's normal mode of deliverance.

6. An air flight missile comprising a payload, a plurality of air flight appendages each separately secured to said payload, and means for effecting a release of said appendages from the payload, said appendages comprising a wing structure positioned on the main body portion of said payload, an intelligence system for seeking a target and guiding the missile toward the target regardless of maneuvering tactics undertaken by the target, an empennage structure positioned at the tail of said payload, and air flight propulsion means connected to the tail of the payload, the payload thereby forming an integral and basic part of the missile airframe and said appendages being separable therefrom during the attack of the missile against a target to permit a terminal attack maneuver substantially equivalent to that normally effected by the payload.

References Cited in the file of this patent

UNITED STATES PATENTS

| | | |
|---|---|---|
| 1,301,083 | Wolford | Apr. 15, 1919 |
| 1,384,559 | Giles et al. | July 12, 1921 |
| 1,508,317 | Crocco et al. | Sept. 9, 1924 |
| 2,147,550 | Sabathe | Feb. 14, 1939 |
| 2,401,853 | Bailey | June 11, 1946 |
| 2,423,090 | Fink et al. | July 1, 1947 |
| 2,539,643 | Smythe | Jan. 30, 1951 |